July 11, 1950            H. LYON            2,514,402

PHOTOGRAPHIC STRIP CONTROL AND INDICATING MECHANISM

Filed July 2, 1946

INVENTOR.
HOWARD LYON

BY

Christie & Aigus

ATTORNEYS

Patented July 11, 1950

2,514,402

UNITED STATES PATENT OFFICE 2,514,402

PHOTOGRAPHIC STRIP CONTROL AND INDICATING MECHANISM

Howard Lyon, Flintridge, Calif., assignor to Consolidated Engineering Corporation, Pasadena, Calif., a corporation of California Application July 2, 1946, Serial No. 681,111

6 Claims. (Cl. 242—55)

This invention relates to photographic strip conveying mechanism and more particularly to devices for indicating irregularities in the conveyance of film from a film feeding roll to a film take-up roll.

In conveying a strip of photographic paper or film such as moving picture film and the like it is the usual practice to carry it from a supply or feed reel, past a camera or exposure position, to a take-up reel. The speed of travel of the strip is usually set at some predetermined rate at which it is desired to move the strip past the exposure position; and this is usually done by means of a sprocket wheel driven at a constant speed from the power drive and having protrusions for engaging sprocket holes in the film or paper strip.

The rotation speed of the supply reel and the take-up reel, however, is not constant, but varies with the change in the amount of film on the reel. As the film or strip is taken from the supply reel, the speed of this reel increases, and as it is rolled up on the take-up reel the speed of the latter reel decreases. It is accordingly the usual practice to drive both the supply reel and the take-up reel from the power drive, through slip clutches, the difference in speed of the reels being taken up by the slippage of the clutches. In practice the power drive tends to drive the take-up reel at a peripheral speed faster than the speed of the strip; and to drive the supply reel at a peripheral speed slower than the speed of the strip. In this way, some tension is maintained on the strip in approaching the sprocket and in leaving the sprocket.

It sometimes happens that the strip jams in its path of travel, and when this happens it is desired to have a warning indication of it so that the machine can be stopped and adjusted. According to my invention I provide such a warning indicator or responsive device operable upon occurrence of an irregularity in the strip travel. This comprises an electrical circuit, including the indicator and a pair of contacts which close upon the happening of the irregularity. In carrying this out I utilize the fact that the film taken from the supply reel is normally under tension so that the driving sprocket is driving the supply reel, by pulling the strip, faster than the power supply is tending to drive it. Under this normal condition, the friction clutch associated with the supply reel is slipping, the slippage causes a stop which I associate with the clutch to be brought up against a corresponding stop which I associate with the power drive. When, however, a jam or tearing of the strip occurs, the sprocket is no longer pulling the strip normally, and the power drive causes the two stops to move apart. Under this condition the stop associated with the clutch is brought into contact with an electrical contactor which I provide for the purpose, and the closing of these contacts closes the indicator circuit.

The foregoing and other features of my invention will be better understood from the following detailed description and the accompanying drawings of which:

Figure 1:
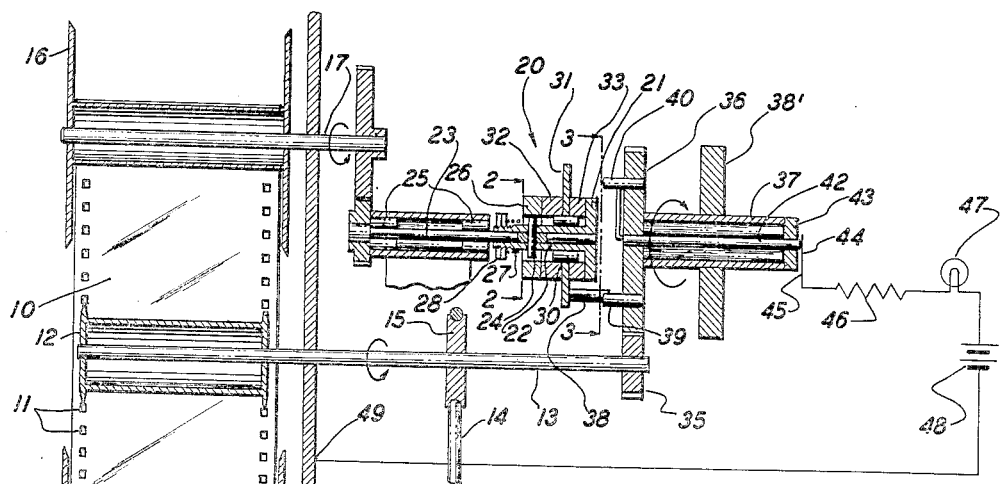
Fig. 1 is a slide elevation view in cross section showing a film driving mechanism and indicating circuit associated therewith according to my invention.
Figure 2:
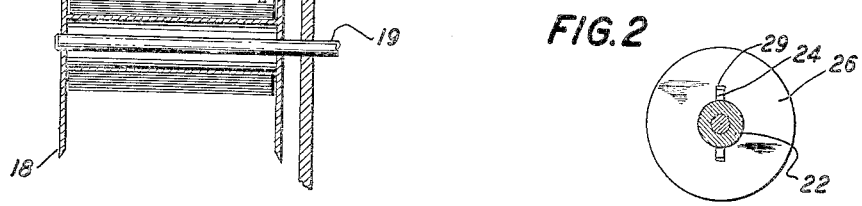
Fig. 2 shows a detail of the mechanism in cross section, taken at line 2—2 of Fig. 1.

Referring to the drawings, there is shown in Fig. 1 a moving-picture type of film or photographic strip 10 provided with sprocket holes 11 in the usual manner for engagement with the teeth of a sprocket wheel 12 attached to a power-driven shaft 13. Shaft 13 may be driven in any suitable manner, for example from an electric motor driven at a proper rate of speed and driving a belt 14 around a pulley 15 which is attached to shaft 13. According to conventional practice, the film is taken from a supply or take-off reel 16, mounted on a shaft 17 and is rolled up on a take-up reel 18, mounted on a shaft 19. In its path of travel from the take-off reel to the take-up reel at the speed determined by the driving motor, the film is carried past an exposure lens or window if it is operating in a camera, or past a projector lens if it is in a projector.

To enable the take-up reel 18 to function satisfactorily, its shaft 19 will be driven from the power-drive at a rate at least sufficiently fast to take up all of the film delivered by the sprocket wheel 12. As the amount of film take-up per revolution of the reel will vary depending upon the amount of film which is rolled on it, the drive for shaft 19 will be through some form of slip-clutch, so that there will always be some tension on the film running between the sprocket and the take-up reel. This slip-clutch will be placed between shaft 19 and the power-drive in any suitable manner which is not shown in the drawing since it is no part of this invention.

For similar reasons, a slip-clutch is used in connection with the take-off reel 16. This is the clutch 20 having the clutch-plate 21 integral with a hub 22 which is fastened by a pin 24 to a shaft 23, which is rotatable in bearings 25. The clutch is provided with a pressure plate 26 mounted over the hub 22 and fastened to the hub against rotation by the pin 24. The pressure plate is supplied with a slot 29, in which the pin fits, and the arrangement is such that the pressure-plate is free to move from left to right with reference to Fig. 1, but may not rotate on the hub because of the pin. A spring 27 held against a pair of locking nuts 28 fastened to hub 22 serves to urge the pressure-plate to the right in Fig. 1.

A bearing 30 is placed over the hub 22 between the plates 21 and 26, and there is snugly fitted over this bearing an annular disc 31, and a pair of clutch discs 32 and 33 respectively on opposite sides of disc 31. The pressure of pressure-plate 26 urged by spring 27 produces a friction contact between the contiguous surfaces of discs 26, 32, 31, 33 and 21. The clutch is driven by a pinion 35 attached to shaft 13, the pinion engaging a gear wheel 36 fastened to a shaft 42, mounted for rotation within a bearing support 37 held in a frame 38'.

Figure 3:
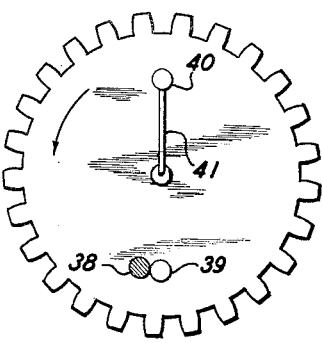
Fig. 3 shows a detail in cross section taken at line 3—3 of Fig. 1 and showing the operation of my invention.

The clutch disc 31 is provided with a driving pin 38, and the gear wheel 36 is provided with a corresponding driving pin means 39; and under normal operations, contact is maintained between pins 38 and 39 as shown in Fig. 3.

Gear wheel 36 is provided with a second pin 40 against which pin 38 makes contact under certain abnormal operating conditions. Pin 40 acts as an electrical contacting pin and has attached to it an electrical conductor 41 connecting to a contacting rod or shaft 42 passing through a bushing 43 and terminating at a contact point 44. There is permanently held in contact with point 44 a spring contactor 45 connected through a resistor 46 and in series with a pilot lamp 47 and a battery 48 to a grounded point 49 on the frame. Wheel 36 and the bearing support frame 38' are insulated in order to insulate from the rest of the mechanism, the electrical circuit elements associated with these members.

In operation, the power-drive turning at a predetermined speed, operates belt 14 which turns sprocket shaft 13 in the forward direction required to take strip from the supply reel and deliver it to the take-up reel. This direction is for example that of the arrow around shaft 13. The turning of shaft 13 drives power-shaft 42 in the opposite direction, indicated by the arrow associated with it. In the absence of other considerations, this would cause pin 40 to rotate into contact with pin 38 of the clutch to drive the supply reel shaft 17 through the clutch, in the direction shown by the arrow associated with it. The gear ratio, however, is such that the pulling of strip 10 from the supply reel 16 drives the supply reel at a somewhat faster rate than it would be driven by pinion 35 through clutch 20. The effect of this is to cause pin 38 to be turned until it strikes pin 39, as shown in Fig. 3.

Since the speed of rotation of gear wheel 36 is fixed by the speed of shaft 13, the striking of pin 38 against pin 39 will not rotate the gear-wheel any faster than its normal speed, and accordingly, slippage will occur in clutch 20 by an amount depending on the speed differential between shafts 23 and 42. Since the speed of disc 31 is held down to the speed of wheel 36, and the speed of disc 21 is somewhat faster than that of disc 31, the slippage will occur at the surfaces of discs 32 and 33. The friction at these surfaces will be moderately light and will determine the amount of pull on the strip 10, which should not be too great, according to good practice.

Figure 4:
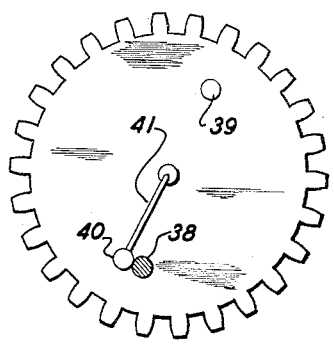
Fig. 4 shows a detail in cross section also taken at line 3—3 of Fig. 1.

Now, if for any reason the strip should tear or jam so that the sprocket wheel should fail to pull the strip from the take-off reel 16 at a proper normal rate, the film will cease to rotate the shaft 23 at a somewhat faster rate than shaft 42, and accordingly, pin 40 on wheel 36 will rotate in the direction of the arrow in Fig. 3 until it strikes pin 38 as shown in Fig. 4. This will close the series circuit through the battery 48 and through the pilot lamp 47, this circuit passing from ground point 49 to battery 48, lamp 47, resistor 46, contacts 44 and 45, shaft 42, conductor 41, pin 40, pin 38, disc 31 to ground again. There is accordingly provided a signal which indicates the jamming, or tearing, or other improper functioning of the strip drive.

Other devices than merely a pilot lamp or bell may be included if desired. For example, there may be provided some form of suitable relay either in addition to or in circuit with lamp 47 to provide an automatic shut-off of the power-drive in some suitable manner.

My invention is useful not only in cameras and projectors using motion picture film, but also is applicable to other types of cameras and the like, such as recording oscillograph cameras in which a strip of sensitized photographic paper is carried past light beams which move according to electrical voltages and currents.

I claim:

1. In combination with a film-conveying mechanism comprising a supply reel containing a rolled photographic strip, a take-up reel on which the strip is rolled, and a sprocket for drawing the strip from the supply reel and delivering it to the take-up reel, and a power drive for driving the sprocket and the reels, the combination which comprises a slip-clutch between the supply reel and the power drive, a member attached to the clutch and a member attached to the drive, a pair of stops on one of said members and a stop on the other of said members arranged so as to be relatively movable between the two stops of said one member, the stop of the said other of said members engaging one of said two stops when the film is being pulled from the supply roll to overdrive the power drive, and engaging the second of the said pair of stops when the power drive is overdriving the pull from the sprocket.

2. In combination with a film-conveying mechanism comprising a supply reel containing a rolled photographic strip, a take-up reel on which the strip is rolled, and a sprocket for drawing the strip from the supply reel and delivering it to the take-up reel, and a power drive for driving the sprocket and the reels, the combination which comprises a slip-clutch between the supply reel and the power drive, a member attached to the clutch and a member attached to the drive, a pair of stops on one of said members and a stop on the other of said members arranged so as to be relatively movable between the two stops of the said one of said members, the stop of the said other of said members engaging one of said two stops when the film is being pulled from the supply roll to overdrive the power drive, and engaging the second of the two stops when the power drive is overdriving the pull from the sprocket, and means for indicating when the stop of said other member engages the second of the two stops.

3. A combination according to claim 2, in which said means comprises an electrical responsive device included in an electric circuit with a source of energizing voltage, said circuit being closed by contact of the stop of the said other of said members with the second of the two stops.

4. In combination with a film conveying mechanism comprising a supply reel containing a rolled photographic strip, a take-up reel on which the strip is rolled and a sprocket for drawing the strip from the supply reel and delivering it to the take-up reel and a power drive for driving the sprocket and the reels, the combination which comprises a shaft fastened to the supply reel, a slip clutch associated with the shaft, reel-driving means attached to the power drive, and three driving pins, one of said driving pins being attached to the clutch and two of said driving pins being attached to the reel driving means, the arrangement being such that in normal operation, the sprocket pulls the strip from the supply reel fast enough to cause the pin attached to the clutch to overtake and contact one of said pins attached to the reel driving means, thereby producing slippage in the clutch, but under conditions of strip feed irregularity, the other of said pins attached to the reel driving means overtakes the pin attached to the clutch, thereby driving the supply reel through the clutch.

5. In combination with a film conveying mechanism comprising a supply reel containing a rolled photographic strip, a take-up reel on which the strip is rolled, a driving device for driving the strip from the supply reel and delivering it to the take-up reel, and a power drive for driving the driving device and the reel, the combination which comprises a shaft fastened to the supply reel, a slip clutch attached to the shaft, driving means for driving the shaft through the slip-clutch, a driving pin on said clutch and a pair of driving pins on the driving means, whereby the first-mentioned driving pin is adapted to make contact with one of said pair of driving pins, depending on whether the driving means is driving the supply reel or whether the supply reel, pulled by the strip, is overdriving the driving means, and an electrical circuit through the first-mentioned driving pin and one of said pair of driving pins for producing an indication when the driving means is driving the supply reel.

6. A combination according to claim 4 in which an electric circuit is provided, said circuit including the pin attached to the clutch and the said other of said pins attached to the reel driving means, so that contact of the two last mentioned pins closes said circuit, and an indicator in said circuit operative in response to closure of the circuit.

HOWARD LYON.

REFERENCES CITED

The following references are of record in the file of this patent:

UNITED STATES PATENTS

| Number | Name | Date |
| --- | --- | --- |
| 2,049,944 | Carpenter | Aug. 4, 1936 |
| 2,212,617 | Otto | Aug. 27, 1940 |